Patented Oct. 5, 1948

2,450,505

UNITED STATES PATENT OFFICE 2,450,505

DRY-CLEANING EMULSION

John R. Fisher, Jr., Dayton, Ohio, assignor to The Commonwealth Engineering Company of Ohio, Dayton, Ohio, a corporation of Ohio No Drawing. Application May 31, 1946, Serial No. 673,605

2 Claims. (Cl. 252—161)

This invention relates to a dry-cleaning liquid, and in particular to a dry-cleaning emulsion.

It is an object of this invention to provide a dry-cleaning fluid which does not leave any marks after application and drying.

It is another object of this invention to provide a dry-cleaning liquid which requires a minimum of effort for removing dirt or the like.

It is still another object of this invention to provide a dry-cleaning fluid which has nap-raising properties, and thus restores the appearance of worn fabrics.

These and other objects are accomplished by mixing from 10 to 90 percent by volume of water with 90 to 10 per cent by volume of carbon tetrachloride and emulsifying this mixture. From the mixtures operative, those having at least 50 percent of carbon tetrachloride are preferable.

Sometimes it is advantageous to add a wetting or emulsifying agent, as for example sorbitol laurate, sulfonaphthyl stearic acid, Trigamine, sodium sulfate of 3,9-diethyl tridecanol-6, the condensation product of ethylene oxide with fatty acids, diglycol laurate, or others known in the art.

For cases where it is desired to apply the cleaning fluid in the form of a foam, it is necessary to add a foaming agent. Soaps or detergents, for example benzylated lauryl alcohol, which is dodecyl alcohol as set forth, for instance in French Patent No. 749,402, may be used therefor.

A formula which yielded especially good results is given in the following example:

Example

| | Cubic centimeters |
|---|---|
| Carbon tetrachloride | 50 |
| Water | 50 |
| Tergitol 7 (sodium sulfate of 3,9-diethyl tridecanol-6) | 5 |
| Benzylated lauryl alcohol | 5 |

The compositions of my invention may be used for all kinds of articles which are to be cleaned. Thus, for example, they may be advantageously used for clothes, rugs, upholstery and other household articles. The compositions are preferably applied with a hard brush as the liquid or in the form of a foam prepared prior to application by whipping, and the articles treated are then wiped dry with a clean cloth.

While water by itself, as well as carbon tetrachloride by itself, leave marks after application and drying, the mixture of the two ingredients was found to dry without the described undesirable phenomenon. This feature which was quite unexpected makes the compositions of my invention especially useful.

It will be understood that this invention is not limited to the details given in the application, but that it is susceptible to various modifications and changes which come within the spirit of the disclosure and the scope of the appended claims.

I claim:

1. A dry-cleaning emulsion consisting of 50 parts by volume of carbon tetrachloride, 50 parts by volume of water, 5 parts by volume of sodium sulfate of 3,9-diethyl tridecanol-6 and 5 parts by volume of benzylated lauryl alcohol.

2. A dry-cleaning emulsion consisting of 50 parts by volume of carbon tetrachloride; 50 parts by volume of water; 5 parts by volume of a water-soluble emulsifying agent; and 5 parts by volume of benzylated lauryl alcohol.

JOHN R. FISHER, Jr.

REFERENCES CITED

The following references are of record in the file of this patent:

UNITED STATES PATENTS

| Number | Name | Date |
|---|---|---|
| 966,136 | Stockhausen | Aug. 2, 1910 |
| 1,165,498 | Frank | Dec. 28, 1915 |
| 1,421,428 | Eckelmann | July 4, 1922 |
| 2,107,287 | Curran | Feb. 8, 1938 |
| 2,271,635 | Flett | Feb. 3, 1942 |
| 2,290,870 | Flett | July 28, 1942 |
| 2,326,772 | Flett | Aug. 17, 1943 |
| 2,327,182 | Flett | Aug. 17, 1943 |

FOREIGN PATENTS

| Number | Country | Date |
|---|---|---|
| 419,649 | France | Jan. 11, 1911 |

OTHER REFERENCES

"Spans and Tweens," Atlas Powder Co., p. 3, 1942.